United States Patent
Cruz-Albrecht et al.

(10) Patent No.: US 11,074,597 B1
(45) Date of Patent: Jul. 27, 2021

(54) CROSS-DISCIPLINARY DEVICE CHARACTERIZATION SYSTEM FOR STRUCTURED ANALYSIS AND TARGETED MARKING

(71) Applicant: HRL Laboratories, LLC, Malibu, CA (US)

(72) Inventors: Laura Cruz-Albrecht, Oak Park, CA (US); Jiejun Xu, Chino, CA (US); Kang-Yu Ni, Calabasas, CA (US); Tsai-Ching Lu, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 210 days.

(21) Appl. No.: 15/730,059

(22) Filed: Oct. 11, 2017

Related U.S. Application Data

(60) Provisional application No. 62/406,842, filed on Oct. 11, 2016.

(51) Int. Cl.
*G06Q 30/02* (2012.01)
*G06Q 50/00* (2012.01)

(52) U.S. Cl.
CPC ..... *G06Q 30/0202* (2013.01); *G06Q 30/0205* (2013.01); *G06Q 30/0261* (2013.01); *G06Q 50/01* (2013.01)

(58) Field of Classification Search
CPC .......... G06Q 30/0202; G06Q 30/0205; G06Q 30/0261; G06Q 50/01
See application file for complete search history.

(56) References Cited

U.S. PATENT DOCUMENTS

| | | | | |
|---|---|---|---|---|
| 8,510,773 | B1* | 8/2013 | Abou-Rizk | ...... H04N 21/25841 725/34 |
| 9,159,055 | B2* | 10/2015 | Davis | ................... G06Q 10/107 |
| 10,255,352 | B1* | 4/2019 | Xu | .......................... G06Q 50/01 |
| 10,305,845 | B1* | 5/2019 | Waagen | ................ H04L 67/306 |
| 2008/0195664 | A1* | 8/2008 | Maharajh | .............. H04L 67/306 |

(Continued)

FOREIGN PATENT DOCUMENTS

JP          2017068547          * 9/2015

OTHER PUBLICATIONS

Lakshman, T. K., and Xander Thuijs. "Enhancing enterprise field productivity via cross platform mobile cloud apps." Proceedings of the second international workshop on Mobile cloud computing and services. ACM, 2011. (Year: 2011).*

(Continued)

*Primary Examiner* — Matthew S Gart
*Assistant Examiner* — Hamzeh Obaid
(74) *Attorney, Agent, or Firm* — Tope-McKay & Associates

(57) ABSTRACT

Described is a system for characterizing communication devices by device type. The system obtains device information for a variety of communication device types, each device type associated with a user account of a bidirectional network. The communication device types are analyzed to perform regional and temporal device characterization, behavioral and feature device characterization, and device homophily analysis on the bidirectional network. The analysis is then used for targeted regional marketing.

21 Claims, 14 Drawing Sheets

(56) References Cited

U.S. PATENT DOCUMENTS

| | | | | |
|---|---|---|---|---|
| 2011/0258049 | A1* | 10/2011 | Ramer | G06Q 30/0273 705/14.66 |
| 2012/0173367 | A1* | 7/2012 | Soroca | G06Q 30/0267 705/26.3 |
| 2013/0041653 | A1* | 2/2013 | Tseng | G06F 16/90324 704/9 |
| 2013/0191195 | A1* | 7/2013 | Carlson | G06Q 30/0224 705/14.17 |
| 2014/0358630 | A1* | 12/2014 | Bhagat | G06Q 30/0201 705/7.29 |
| 2017/0019474 | A1* | 1/2017 | Tevosyan | G06Q 50/01 |
| 2017/0052968 | A1* | 2/2017 | Stokes | G06F 16/9535 |

OTHER PUBLICATIONS

Chen, Peng-Ting, and Hsin-Pei Hsieh. "Personalized mobile advertising: Its key attributes, trends, and social impact." Technological Forecasting and Social Change 79.3 (2012): 543-557. (Year: 2012).*

Poblete, Barbara, et al. "Do all birds tweet the same?: characterizing twitter around the world." Proceedings of the 20th ACM international conference on Information and knowledge management. ACM, 2011. (Year: 2011).*

Kim, Ki Youn, and Bong Gyou Lee. "Marketing insights for mobile advertising and consumer segmentation in the cloud era: AQ-R hybrid methodology and practices." Technological Forecasting and Social Change 91 (2015): 78-92. (Year: 2015).*

Hamka, Fadly. "Smartphone's customer segmentation and targeting: Defining market segment for different type of mobile service providers." (2012). (Year: 2012).*

Barbera, Marco V., et al. "Signals from the crowd: uncovering social relationships through smartphone probes." Proceedings of the 2013 conference on Internet measurement conference. 2013. (Year: 2013).*

Cao, P., D. Zhao, and O. Zaiane. "Advances in knowledge discovery and data mining." (2013): 280-292. (Year: 2013).*

Newman, Mark EJ. "Mixing patterns in networks." Physical review E 67.2 (2003): 026126. (Year: 2003).*

Zhang, Zhijun, and Hong Liu. "Social recommendation model combining trust propagation and sequential behaviors." Applied Intelligence 43.3 (2015): 695-706. (Year: 2015).*

M. Perreault and D. Ruths. The effect of mobile platforms on twitter content generation. In International AAAI Conference on Web and Social Media, 2011, pp. 289-296.

H. Falaki, R. Mahajan, S. Kandula, D. Lymberopoulos, R. Govindan, and D. Estrin. Diversity in smartphone usage. In Proceedings of the 8th International Conference on Mobile Systems, Applications, and Services, MobiSys '10, pp. 179-194, New York, NY, USA, 2010.

B. Poblete, R. Garcia, M. Mendoza, and A. Jaimes. Do all birds tweet the same?: Characterizing twitter around the world. In Proceedings of the 20th ACM International Conference on Information and Knowledge Management, CIKM 11, pp. 1025-1030, New York, NY, USA, 2011.

A. Mislove, S. Lehmann, Y.-Y. Ahn, J.-P. Onnela, and J. N. Rosenquist. Understanding the Demographics of Twitter Users. In Proceedings of the 5th International AAAI Conference on Weblogs and Social Media (ICWSM'11), Barcelona, Spain, Jul. 2011, pp. 554-557.

M. McPherson, L. Smith-Lovin, and J. M. Cook. Birds of a Feather: Homophily in Social Networks. Annual Review of Sociology, pp. 415-444, 2001.

F. A. Zamal, W. Liu, and D. Ruths. Homophily and latent attribute inference: Inferring latent attributes of twitter users from neighbors. In J. G. Breslin, N. B. Ellison, J. G. Shanahan, and Z. Tufekci, editors, ICWSM. The AAAI Press, 2012, pp. 387-390.

J. H. Kang and K. Lerman. Using lists to measure homophily on twitter. In AAAI Technical Report WS-12-09, pp. 26-32. Association for the Advancement of Artificial Intelligence, 2012.

R. Compton, D. Jurgens, and D. Allen. Geotagging one hundred million twitter accounts with total variation minimization. CoRR, abs/1404.7152, 2014, pp. 393-401.

P. S. Dodds, K. D. Harris, I. M. Kloumann, C. A. Bliss, and C. M. Danforth. Temporal patterns of happiness and information in a global social network: Hedonometrics and twitter. CoRR, abs/1101.5120, 2011, pp. 1-27 and S1-S30.

L. Mitchell, K. D. Harris, M. R. Frank, P. S. Dodds, and C. M. Danforth. The geography of happiness: Connecting twitter sentiment and expression, demographics, and objective characteristics of place. CoRR, abs/1302.3299, 2013, pp. 1-15.

M. E. J. Newman. Mixing patterns in networks. Phys. Rev. E 67, 026126, 2003, pp. 026126-1-026126-13.

Laura Cruz-Albrecht, Jiejun Xu, Kang-Yu Ni and Tsai-Ching Lu: Characterizing Regional and Behavioral Device Variations Across the Twitter Timeline: a Longitudinal Study. In ACM Web Science Conference (WebSci), Troy, USA, 2017, pp. 1-10.

E. Fischer. Making the most detailed tweet map ever. h t t p. s: / / blog.mapbox.com/making-the-most-detailed-tweet-map-ever-b54da237c5ac. Taken on Aug. 1, 2017, pp. 1-9.

* cited by examiner

| General: | |
|---|---|
| Number of users | 365,976,094 |
| Number of devices | 375,539,502 |
| Percent devices identified | 80.603% |
| Types of generators | 522,956 |
| TB JSON data | 9.954; compressed |

FIG. 4

Device:

| Device type | Count- | Percent- | Number of Tweets |
|---|---|---|---|
| Android | 66,822,701 | 17.794% | 5,520,802,403 |
| iPhone-iOS | 66,160,585 | 17.617 | 8,560,164,598 |
| BlackBerry | 26,171,384 | 6.969 | 2,850,623,390 |
| Nonmobile | 139,566,209 | 37.164 | 5,562,837,645 |
| Other mobile | 3,976,692 | 1.059 | 95,918,241 |
| (unknown) | (72,841,931) | (19.397) | - |

FIG. 5

| Rank | Most users | Android | iPhone-iOS | BlackBerry | Nonmobile | Other mobile |
|---|---|---|---|---|---|---|
| 1 | U.S.A. | U.S.A. | U.S.A. | Indonesia | U.S.A. | U.S.A. |
| 2 | Japan | Japan | Japan | U.K. | Brazil | Indonesia |
| 3 | Indonesia | Spain | U.K. | Saudi Arabia | Indonesia | Argentina |
| 4 | U.K. | Indonesia | Saudi Arabia | Venezuela | U.K. | U.K. |
| 5 | Brazil | U.K. | Canada | Argentina | Turkey | Mexico |
| 6 | Spain | Saudi Arabia | Mexico | South Africa | Argentina | Brazil |
| 7 | Saudi Arabia | South Korea | France | Colombia | Mexico | Turkey |
| 8 | Turkey | Turkey | Spain | Nigeria | Phillipines | France |
| 9 | Mexico | Brazil | Turkey | Mexico | Spain | Spain |
| 10 | Argentina | Mexico | Brazil | U.S.A. | Japan | Malaysia |
| 11 | Canada | Argentina | Netherlands | Spain | Colombia | India |
| 12 | Phillipines | Malaysia | Phillipines | Canada | France | Colombia |

FIG. 7

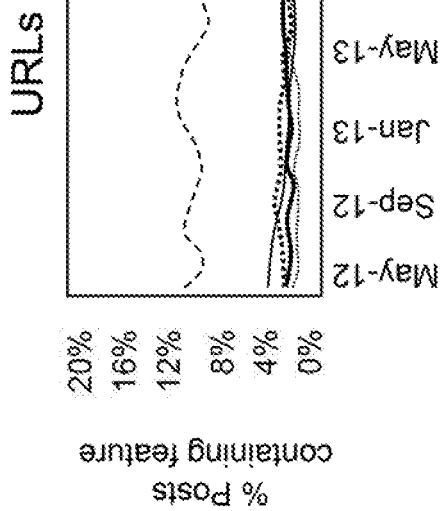
FIG. 10B
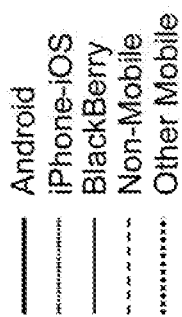
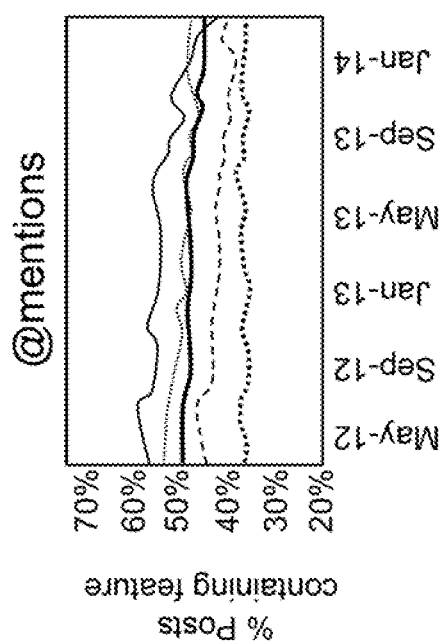
FIG. 10A
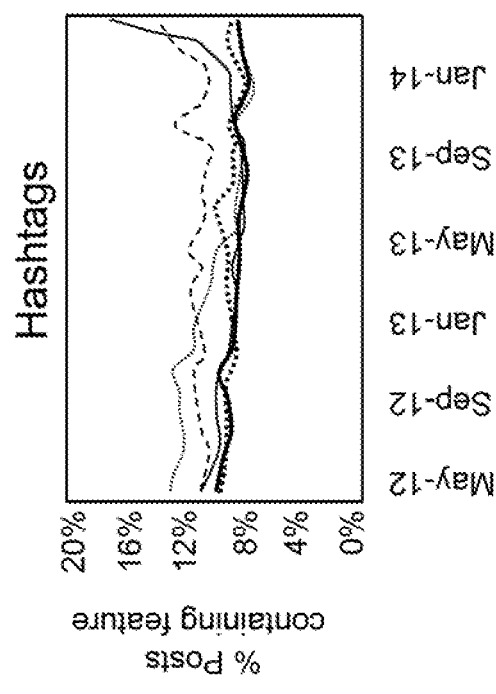
FIG. 10C

CROSS-DISCIPLINARY DEVICE CHARACTERIZATION SYSTEM FOR STRUCTURED ANALYSIS AND TARGETED MARKING

CROSS-REFERENCE TO RELATED APPLICATIONS

This is a Non-Provisional application of U.S. Provisional Application No. 62/406,842, filed in the United States on Oct. 11, 2016, entitled, "Cross-Disciplinary Device Characterization System for Structured Analysis and Targeted Marketing," the entirety of which is incorporated herein by reference.

BACKGROUND OF INVENTION

(1) Field of Invention

The present invention relates to a system for characterizing devices utilized across social media platforms and, more particularly, to a system for characterizing devices utilized across social media platforms which longitudinally analyzes variations across the devices.

(2) Description of Related Art

Social media has attained astounding ubiquity across the globe, but despite this, relatively little is known about how user interaction with social media varies on a device to device level. Previous approaches to studying devices across social media have tended to focus on only a few categories, and do not take longitudinal variations into account. Perreault et al. (see Literature Reference No. 1 in the List of Incorporated Literature References) investigated differences in Tweets® produced by mobile versus nonmobile platforms; they categorized Twitter® devices into these two categories, assessed differences between them, and found that mobile Tweets® vary considerably from their nonmobile counterparts.

In another work, Falaki et al. (see Literature Reference No. 2) investigated diversity and similarities among 1) Android, and 2) Windows mobile users, and found that some qualities, such as average daily interaction, vary widely among individual users, while other qualities, such as relative application popularity, remain quite similar.

On a regional level, Poblete et al. (see Literature Reference No. 3) studied how Twitter® usage varies across the ten most active countries, studying such qualities as sentiment, activity level, and network structure. Mislove et al. (see Literature Reference No. 4) also considered the geography of Twitter® users in a demographics-oriented study comparing geographic distribution, gender, and race of Twitter® users compared to the United States (U.S.) population, and found that the Twitter® community is not proportionally representative of U.S. demographics as a whole. Additionally, GNIP (Twitter's enterprise application program interface (API) platform) and Fisher (see Literature Reference No. 12) worked to produce a visualization of four mobile device categories—Android, iPhone, Android, and Other—across the globe using 280 million Tweets®. Their interactive map visually illustrates the varying distribution of mobile devices across the globe.

Furthermore, prior work has studied homophily, the tendency for individuals to associate with other similar individuals, across other dimensions, including gender, age, and race. Within Twitter® specifically, Zamal et al. (see Literature Reference No. 6) studied age, gender, and political orientation homophily, and used this to perform latent attribute inference. Kang et al. (see Literature Reference No. 7) studied Twitter® topical lists to demonstrate evidence of topical homophily on Twitter®.

Thus, a continuing need exists for a system for performing an entirely device-oriented analysis using device categories in greater granularity than previous works, and additionally, employing techniques to longitudinally analyze variations across the devices.

SUMMARY OF INVENTION

The present invention relates to a system for characterizing devices utilized across social media platforms and, more particularly, to a system for characterizing devices utilized across social media platforms which longitudinally analyzes variations across the devices. The system comprises one or more processors and a memory having instructions such that when the instructions are executed, the one or more processors performs multiple operations. The system obtains communication device information for a variety of communication device types, each device type associated with a user account of a bidirectional network. The variety of communication device types are analyzed to perform regional and temporal device characterization, behavioral and feature device characterization, and device homophily analysis on the bidirectional network. Based on analysis of the variety of communication device types, the system causes an advertisement on a social media page to be displayed to a user device in a targeted region.

In another aspect, the analysis of the variety of communication device types is used for device sales forecasting.

In another aspect, the device information comprises user-device data, user-location data, and a social network of interconnected user accounts.

In another aspect, the system generates patterns of global device usage over time, generates a regional distribution of devices, and generates patterns of regional device usage over time.

In another aspect, the system analyzes temporal sentiment patterns by communication device type.

In another aspect, the system analyzes usage of a set of features of the bidirectional network by distinct communication device types over time, wherein the set of features comprises at least one of a mention of another user account on the bidirectional network, a reference to an online resource, a reference to a topic, and a re-post of another user account's post on the bidirectional network.

In another aspect, display of the advertisement is further based on at least two of performing regional and temporal device characterization; performing behavioral and feature device characterization; and performing device homophily analysis on the bidirectional network.

In another aspect, display of the advertisement is further based on performing regional and temporal device characterization; performing behavioral and feature device characterization; and performing device homophily analysis on the bidirectional network.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4 is a table illustrating general dataset statistics according to some embodiments of the present disclosure;

FIG. 5 is a table illustrating device dataset statistics according to some embodiments of the present disclosure;

FIG. 7 is a table illustrating the top 12 countries by device type according to some embodiments of the present disclosure;

FIG. 10A is a plot illustrating device feature usage over time for mentions according to some embodiments of the present disclosure;

FIG. 10B is a plot illustrating device feature usage over time for uniform resource locators (URLs) according to some embodiments of the present disclosure;

FIG. 10C is a plot illustrating device feature usage over time for hashtags according to some embodiments of the present disclosure;

DETAILED DESCRIPTION

Figure 1:
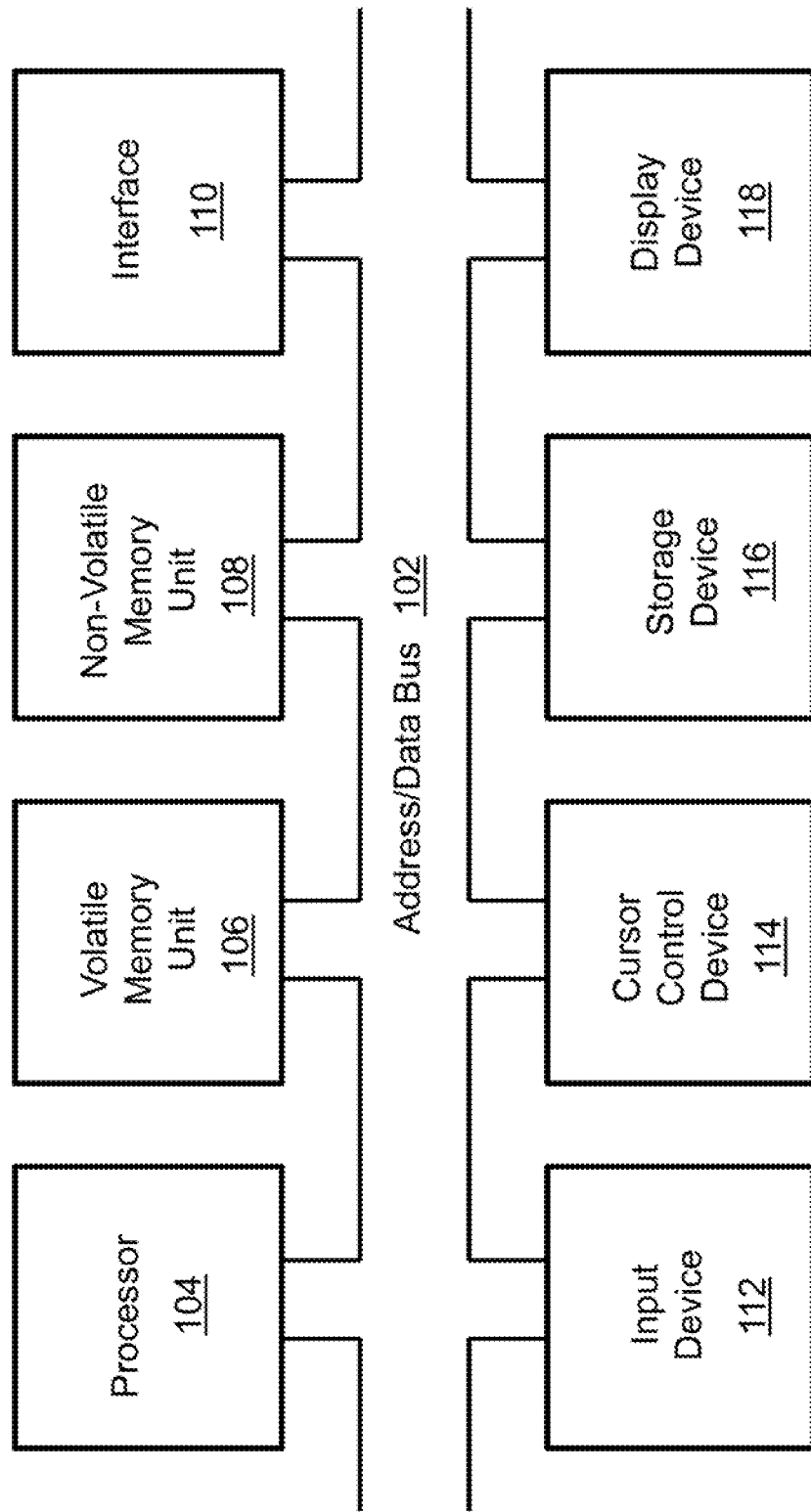
FIG. 1 is a block diagram depicting the components of a system for characterizing devices utilized across social media platforms according to some embodiments of the present disclosure.

The present invention relates to a system for characterizing devices utilized across social media platforms and, more particularly, to a system for characterizing devices utilized across social media platforms which longitudinally analyzes variations across the devices. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number as follows:

0 M. Perreault and D. Ruths. The effect of mobile platforms on twitter content generation. In International AAAI Conference on Web and Social Media, 2011.

1 H. Falaki, R. Mahajan, S. Kandula, D. Lymberopoulos, R. Govindan, and D. Estrin. Diversity in smartphone usage. In Proceedings of the 8th International Conference on Mobile Systems, Applications, and Services, MobiSys '10, pages 179-194, New York, N.Y., USA, 2010.

2 B. Poblete, R. Garcia, M. Mendoza, and A. Jaimes. Do all birds tweet the same?: Characterizing twitter around the world. Un Proceedings of the 20th ACM International Conference on Information and Knowledge Management, CIKM '11, pages 1025-1030, New York, N.Y., USA, 2011.

3 A. Mislove, S. Lehmann, Y.-Y. Ahn, J.-P. Onnela, and J. N. Rosenquist. Understanding the Demographics of Twitter Users. In Proceedings of the 5th International AAAI Conference on Weblogs and Social Media (ICWSM'11), Barcelona, Spain, July 2011.

4 M. McPherson, L. Smith-Lovin, and J. M. Cook. Birds of a Feather: Homophily in Social Networks. Annual Review of Sociology, pp. 415-444, 2001.

5 F. A. Zamal, W. Liu, and D. Ruths. Homophily and latent attribute inference: Inferring latent attributes of twitter users from neighbors. In J. G. Breslin, N. B. Ellison, J. G. Shanahan, and Z. Tufekci, editors, ICWSM. The AAAI Press, 2012.

6 J. H. Kang and K. Lerman. Using lists to measure homophily on twitter. In AAAI Technical Report WS-12-09, pages 26{32. Association for the Advancement of Artificial Intelligence, 2012.

7 R. Compton, D. Jurgens, and D. Allen. Geotagging one hundred million twitter accounts with total variation minimization. CoRR, abs/1404.7152, 2014.

8 P. S. Dodds, K. D. Harris, I. M. Kloumann, C. A. Bliss, and C. M. Danforth. Temporal patterns of happiness and information in a global social network: Hedonometrics and twitter. CoRR, abs/1101.5120, 2011.

9 L. Mitchell, K. D. Harris, M. R. Frank, P. S. Dodds, and C. M. Danforth. The geography of happiness: Connecting twitter sentiment and expression, demographics, and objective characteristics of place. CoRR, abs1302.3299, 2013.

10 M. E. J. Newman. Mixing patterns in networks. Phys. Rev. E 67, 026126, 2003.

11 E. Fischer. Making the most detailed tweet map ever. https:/blog.mapbox.com/making-the-most-detailed-tweet-map-ever-b54da237c5ac. Taken on Aug. 1, 2017.

(2) Principal Aspects

Various embodiments of the invention include three "principal" aspects. The first is a system for characterizing devices utilized across social media platforms. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
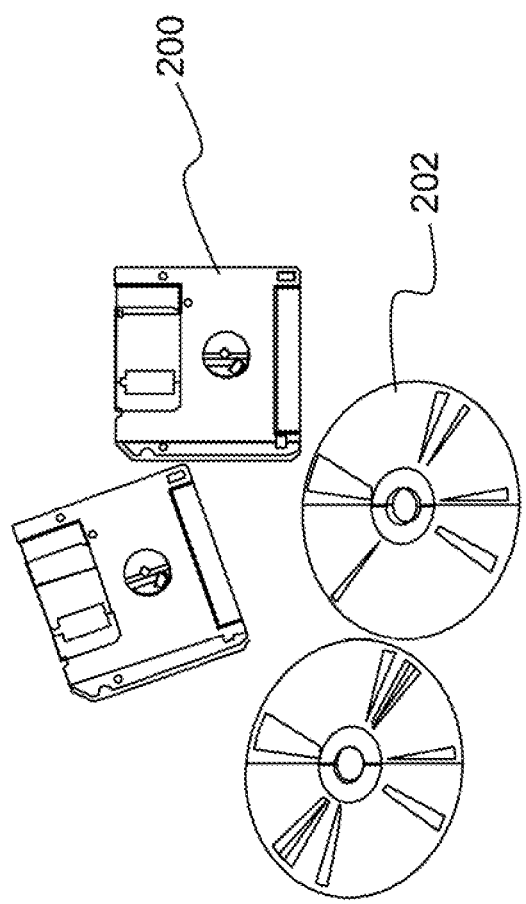
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments of the Invention

Physical communication devices types, ranging from a plethora of smartphones, to tablets, to laptop and desktop devices, provide the key interface by which users engage with the social media world. Yet despite the broad range of devices used on social media platforms, relatively little is known about how usage varies on a device to device level. Described herein is a system for performing measurement-driven cross-disciplinary characterization of a set of distinct device categories. While examples in this disclosure focus on characterizing Twitter® data, one skilled in the art can appreciate that the invention is generalizable to alternative social media or multi-device employing platforms.

The system according to embodiments of the present disclosure characterizes distinct device categories across three core areas: longitudinal (i.e., observations over long period of time) global and regional growth and distribution, longitudinal user behavior and feature usage, and device homophily. Taken together, this provides a unique system for comprehensively analyzing distinct devices used on social media platforms. In contrast to previous investigations of devices or regional (i.e., geographical) distributions of users, the system according to embodiments of this disclosure comprehensively performs an entirely device-oriented analysis using device categories in greater granularity than past works, and additionally, employs techniques to longitudinally analyze variations across the devices.

This system is the first large-scale measurement-driven temporal characterizer of multiple distinct device categories across the Twitter® timeline. The invention employs more detailed device analysis by examining several distinct categories: Android, iPhone-iOS, BlackBerry, non-mobile, and other mobile (while previous works have investigated only mobile vs. nonmobile, or only Android vs. Windows phone). Moreover, the system described herein leverages a large-scale dataset over a broad time frame to employ a unique longitudinal characterization of devices, which can potentially enable real-time monitoring of device usage across the globe for targeted marketing as well as sales forecasting.

Starting with a collection of Twitter® data (10% sample spanning 2 consecutive years), the system first performs pre-processing tasks to 1) obtain device information for each user in the dataset by first extracting the generator (e.g., app, website) responsible for producing the Tweet®, and then leveraging the generator using a device mapper algorithm; 2) obtain location information for each user; and 3) obtain a social network based on user-user interactions. These final two components can alternatively be swapped out of the pre-processing module if they pre-exist and can be obtained as-is. Then, the harvested device information, in conjunction with other output from the pre-processing module, is piped into a three-tiered characterization module that analyzes devices in the network in order to 1) perform regional and temporal device characterization; 2) perform device behavioral and feature characterization; and 3) perform "device homophily" analysis on the network. A unique aspect of the invention is a measurement-driven method comprehensively characterizing distinct devices.

(3.1) System Block Diagram and Detailed Description

Figure 3A:
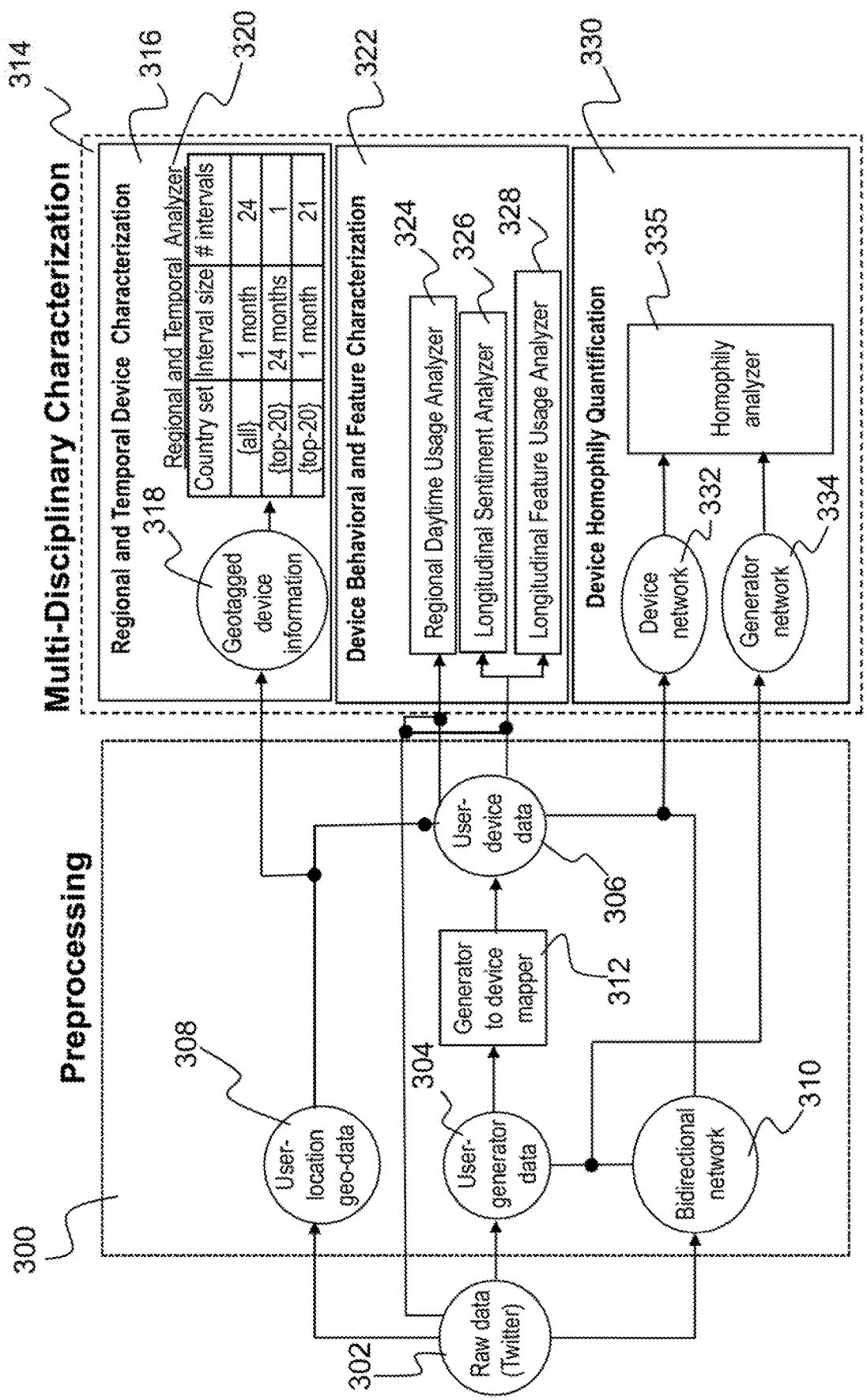
FIG. 3A illustrates the device characterization system according to some embodiments of the present disclosure.
Figure 3B:
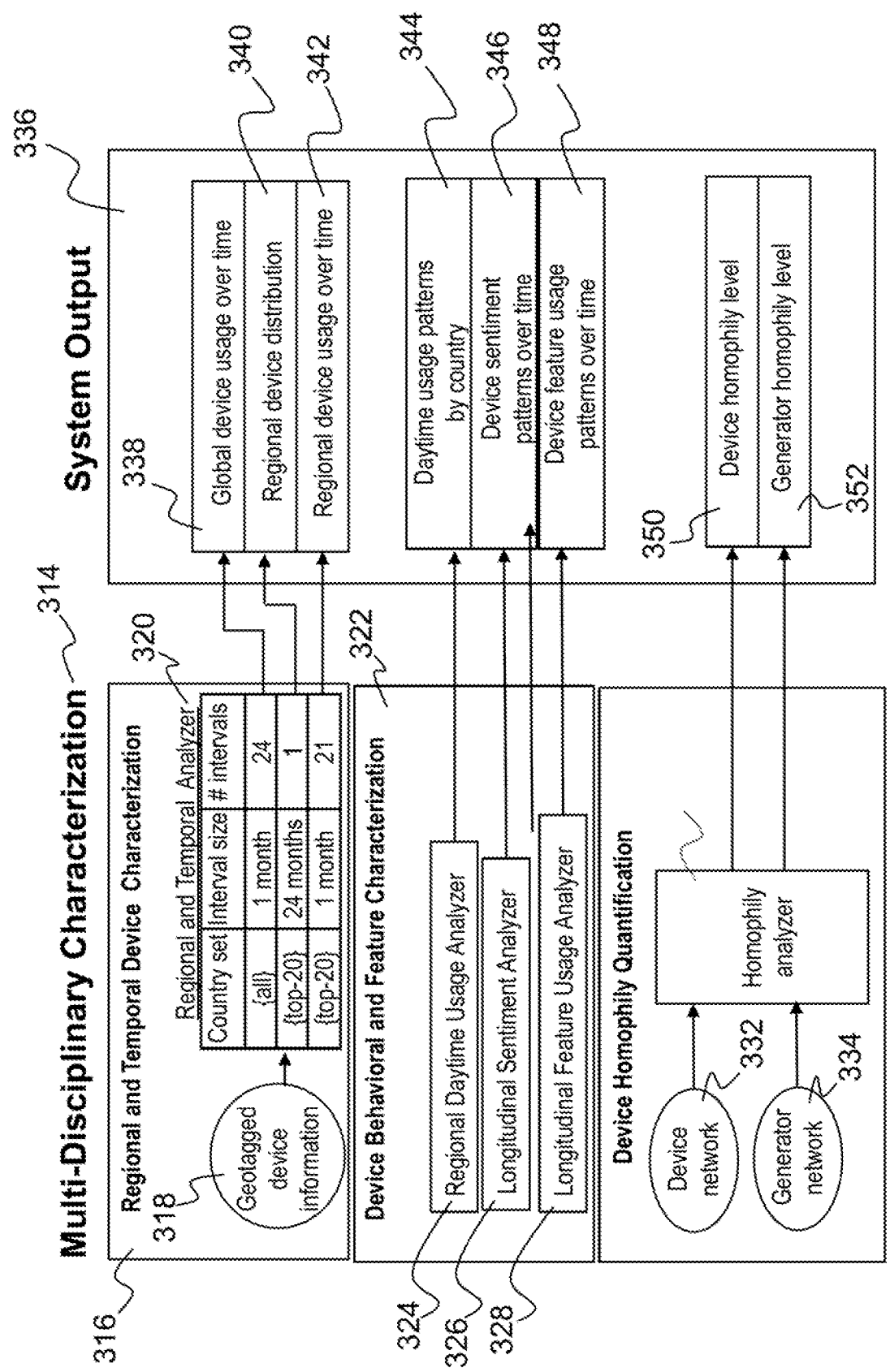
FIG. 3B illustrates the device characterization system according to some embodiments of the present disclosure.

FIGS. 3A-3B illustrate the steps comprising the device characterization pipeline. Each component will be elaborated upon in the following sections. The embodiment described herein is configured for analyzing the Twitter® platform; however, as can be appreciated by one in the art, the flexible, modular pipeline allows for straightforward component replacement for alternative social medial platforms.

(3.1.1) Pre-Processing Module (FIG. 3A, Element 300)

The first step of the pipeline is to perform preliminary extraction of raw data 302 to obtain: 1) user-generator data 304, and, more critically, the user-device data 306 it provides; 2) user-location geo-data 308; and 3) a social network of interconnecting the Twitter users (i.e., bidirectional network 310).

In order to perform any device-driven analysis, first a device is assigned to each user. To do so, first extract the "generator" information for each user (i.e., user-generator data 304). The generator field is present in the Twitter® JSON data, and lists the application of website responsible for producing the Tweet®9 in question. The following is a non-limiting example of a JSON file, which depicts a "generator" field. In this example "Twitter for Android" is in the generator field.

"verb": "post",
"postedTime": "2013-08-08T06:59:49.000Z",
"generator": {
   "displayName": "Twitter for Android",
   "link": (link to Twitter.com)
},
"provider": {
   "objectType": "service",
   "displayName": "Twitter",
   "link": (link to Twitter.com)
}, The output of this task is given to the device mapper 312 function to determine which device, rather than generator, each user is associated with. In one embodiment, the generators were mapped to one of six device categories (e.g., variety of communication device types). The variety of communication device types can include mobile and non-mobile devices having a display to receive information/communication via social media websites. Non-limiting examples of communication device types include Android, iPhone-iOS, BlackBerry, non-mobile (desktop, laptop, iPad), other mobile, and unknown. The generator field to device mapper 312 employs one of the following conversions.

The system described herein reviews a "generator" field for each Tweet® encapsulated in a GNIP JSON file, which lists the application or website, responsible for producing the Tweet® in question. Examples of generator fields used for Android devices are "Twitter for Android", "Twitter for Android Tablets", and "Tweetcaster for Android." Examples of generator fields used for iPhone-iOS include "Twitter for iPhone", "Twitter for iPad", and "Tweetcaster for iOS." Examples of generator fields for BlackBerry devices include "Twitter for BlackBerry" and "UberSocial for BlackBerry." For non-mobile devices, examples of generator fields include the "Web" (official Twitter website), the nonmobile-only "Twitterfeed" platform, and generators intended for Macs or PCs. Other generators are identifiable as intended for devices, such as Windows phones, Nokia phones, Samsung mobile, or LG phone. Devices associated with generators that were unidentifiable or ambiguous (i.e., could be used by multiple devices without distinction), such as "Google" and "Echofon" were excluded from the analysis.

For some embodiments, the pre-processing module 300 also ensures that user-location geo-data 308 is available, and that a social network is available. In this example, the geotagged data previously constructed was leveraged by Compton (see Literature Reference No. 8) using the same dataset with total variation minimization. For alternative social media platforms, this information can likewise be derived from the raw data 302, or perhaps be obtained through techniques such as cross-network alignment. To construct a social network, where nodes are the users and edges represent social connections between users, various indicators of a social bond can be used to connect users including, but not limited to, direct following (see Literature Reference No. 3), indirect following (see Literature Reference No. 7), and @mentioning (see Literature Reference No. 8). In one embodiment, the @mention network was used; however, the system described herein is flexible to any technique which produces a social network.

(3.1.2) Multi-Disciplinary Characterization Module (FIG. 3A, Element 314)

The next step of the pipeline is three-tiered. The first unit (element 316) performs regional and temporal device characterization. By merging user-location geo-data 308 and user-device data 306 from the pre-processing module (element 300), geotagged device information 318 is obtained. This is then provided to a flexible regional and temporal analyzer 320 which, depending on the parameters set, generates either: 1) the global device usage patterns over time; 2) the regional distribution of devices (non-temporal); or 3) the regional device usage patterns over time. This information can subsequently be leveraged for such applications as targeted regional marketing or real-time device sales forecasting. A forecast can be generated and displayed on a communication device (e.g., elements 1306, 1308, 1310, and 1312 in FIG. 13). The forecast may be delivered to the display via a social media account post or via text or email. The forecast may be in the form of a table of data, a graph, a list, or in any other format that can provide the necessary information.

The second unit (element 322) performs device behavioral and feature characterization. In particular, three facets are characterized. First, regional daytime usage patterns are analyzed by the pipeline (element 324). The raw Twitter® data (element 302), device data (element 306), and user-location data (element 308) is used to analyze the regional daytime usage patterns (element 324) of distinct device types. The Twitter® data is filtered to contain only Tweets® from users within a particular country. Then, each remaining user's device information is obtained via the user-device data (element 306). Using the location of the users (element 308), the UTC (universal time coordinated) time provided in the Tweet® is converted to the user's local time, bucketed to the nearest hour in the range [0, 23].

Second, temporal sentiment patterns by device type are analyzed by the pipeline via a longitudinal sentiment analyzer 326. To do so, the procedure outlined in Dodds et al. (see Literature Reference No. 9) and Mitchell et al. (see Literature Reference No. 10) was utilized. The idea behind sentiment analysis is to quantify the average happiness level h_avg, or sentiment, of a large corpus of words. For analysis, the labMT 1.0 (Language Assessment by Mechanical Turk) word list available from Dodds et al. (see Literature Reference No. 9) was used. The corpus is comprised of the 10,222 most common English words obtained from four sources: Google Books, the New York Times, Twitter®, and music lyrics. Each word is assigned an average happiness score between 1 and 9, with larger scores indicating higher happiness. To obtain sentiment scores for each device in our set, the following calculation was leveraged:

$$h_{avg}(D_a) = \frac{\sum_{i=1}^{N} h_{avg}(w_i) \cdot f_{i,a}}{\sum_{i=1}^{N} f_{i,a}}$$

$h_{avg}(D_a)$ is the average happiness of mobile device type 'a', $D_a$ is the corpus of words derived from tweets by device type 'a', $h_{avg}(w_i)$ is the average happiness value for word $w_i$ in the labMT word list, and $f_{i,a}$ is the frequency of $w_i$ in $D_a$. Note that the numerator is a summation over a series of multiplications.

To see whether certain devices display higher sentiment than others, as well as whether device-specific sentiment fluctuates over time, the system perform a longitudinal sentiment analysis by computing $h_{avg}$ on monthly intervals.

Thirdly, the behavioral and feature characterization pipeline analyzes the usage of features by distinct device types over time through a longitudinal feature usage analyzer 328. In one embodiment of the invention, the following features are examined:

Mentions: the body of the tweet contains an "@" symbol prepended to another person's username, indicating the Tweet® is directly addressing her Uniform Resource Locators (URLs): Tweet® contains a link Hashtags: Tweet® contains at least one word containing "#" prepended to it, indicating the Tweet® is related to particular topic, such as "#music"

Retweets: Tweet® is a re-post of another user's post

For the mention, URL, and hashtag features, the fraction of posts by a given device type that contained at least one instance of the feature in question were investigated. For the retweet calculation, the fraction of total Tweets® (retweets plus posts) that were retweets were investigated. In addition, the overall percentage of Tweets® per device type was examined.

Finally, the multi-disciplinary characterization module 314 quantifies the level of "device homophily" within the network (element 330). Homophily is, as described by McPherson (see Literature Reference No. 5), "the principle that a contact between similar people occurs at a higher rate than among dissimilar people." Fundamentally, the homophily principle states that individuals have a tendency to be similar to their friends. This widely studied fundamental organizing principle of social networks has been found across diverse social and demographic attributes, including race, age, religion, gender, occupation, and geographic proximity. However, while homophily has been widely examined across social and demographic features, little work has been done to investigate this property across other dimensions. Note that although the term "device homophily" is the term used herein to describe the property examined (namely, connectivity between similar devices), "device homophily" does not imply that similarity causes connections to form, as in the case of social homophily. Thus, although this term is used, it can equivalently be conceived of as "device assortativity."

In order to investigate device homophily, a network consisting of interconnected devices was needed. To obtain this, the social network (i.e., bidirectional network 310) derived from the pre-processing stage (element 300) was merged with the user-device data 306 from the pre-processing stage (element 300) to obtain a graph of interconnected devices (i.e., device network 332). Nodes of the device network 332 represent the user's devices, and weighted edges of the device network 332 connect devices whose associated users mutually @mentioned each other (with the edge weight equal to the minimum number of reciprocated @mentions).

Next, a way to quantify the level of device homophily within the network is needed. As a non-limiting example, the procedure disclosed by Newman (see Literature Reference No. 11) can be used. First, a matrix C is created consisting of all the weighted counts of device-device edges in the network, where $M_{ij}$ is equal to the sum of the weights of the edges between a device of type i and a device of type j. Then, matrix C was normalized to create the mixing matrix M, where the sum of M's values is 1. Thus, $M_{ij}$ represents the fraction of edges between device i and device j, and, as the device network 332 is undirected, M is symmetric. Using M, the level of assortativity in the network was computed using the following assortativity coefficient equation derived from Newman (see Literature Reference No. 11):

$$h = \frac{\sum_i M_{ii} - \sum_i a_i^2}{1 - \sum_i a_i^2}.$$

M is a symmetric matrix, where each element represents the fraction of edges between device i and device j in an @mention network. $a_i$ is equal to the sum of the i-th row of the M matrix. The calculation is to quantify the dominance of the diagonal, as compared to the off-diagonal values in the M matrix. If the network is truly homophilous, or assortative, one would expect the diagonal values to be larger, and thus h to have a larger value.

The above equation is used for two reasons: 1) since assortativity is the propensity for connections to exist between similar vertices, one can leverage such computations to measure the "device homophily" that needs to be quantified; and 2) this equation, as compared to alternatives, remains effective even when certain vertex types are much more common than others. The idea behind this calculation is to quantify the dominance of the diagonal, as compared to the off-diagonal values. If the network is truly homophilous, or assortative, one would expect the diagonal values to be larger and, thus, h to have a larger value. Thus, in the case of a network with high homophily, h=1; in a network absent of homophily (often, random mixing), h=0; and in a network that possesses perfect heterophily (nodes tend to be connected to dissimilar nodes), $-1 \leq h < 0$. Similarly, this approach can be applied to the user-generator information (element 304), rather than user-device information (element 306), to obtain a generator network 334. A homophily analyzer 335 quantifies how frequent users are connected to each other based on combinations of device pairs (e.g., iOS and iOS, iOS and Android).

(3.1.3) System Output (FIG. 3B, Element 336)

Each subprocess of the multi-disciplinary characterization module 314 produces quantitative results that characterize distinct devices across various dimensions. The outputs are specific to the dataset being analyzed, including, but not limited to, global usage device over time 338, regional device distribution 340, regional device usage over time 342, daytime usage patterns by country 344, device sentiment patterns over time 346, device feature usage patterns over time 348, device homophily pattern 350, and generator homophily pattern 352. In the following section, the results of applying the system to a 10% sample of two consecutive years of Twitter® data are described.

(3.2) Experimental Studies

The system according to embodiments of the present disclosure was evaluated using a 10% sample of publicly available Tweets® from May 1, 2012 to Apr. 30, 2014. Taken together, the dataset consists of 365,976,094 users, 9.9538 terabytes (TB) of compressed JSON data, and spans a two-year time period. Using the approach described above, each user was associated with the device that he/she used most often to account for the fact that some users employed more than one device. In the case that devices were tied as most prevalent, each device was counted. These users in effect appear more than once in the counting. However, this case only affects 2.49% of users, and was determined to be more accurate than excluding them from analysis. In total, 80.603% of devices were categorized into either Android, iPhone-iOS, BlackBerry, non-mobile, or other mobile categories. The remaining percent fell into the unknown category and were excluded from analysis. Statistics for the dataset are summarized in the tables of FIGS. 4 and 5, where FIG. 4 is a table of general dataset statistics, and FIG. 5 is a table of device dataset statistics.

Figure 6:
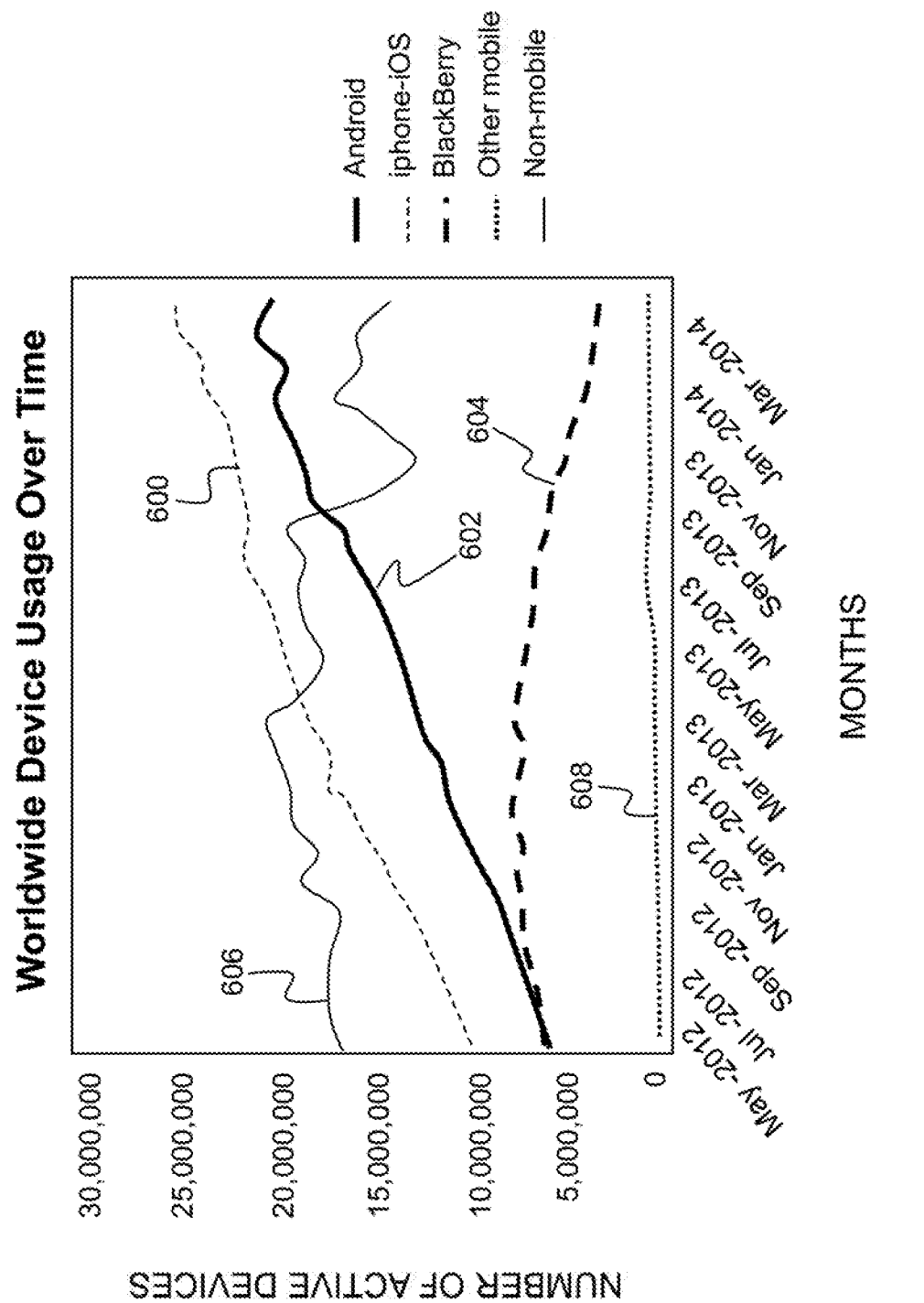
FIG. 6 is a plot illustrating worldwide device usage over time according to some embodiments of the present disclosure.

(3.2.1) Regional and Temporal Device Characterization (3.2.1.1) Worldwide Temporal Usage Patterns First, the worldwide trend of device usage over time was investigated. For each month, the number of active devices were counted, where "active" entailed having sent at least one Tweet® during that month. The results of worldwide usage over time are shown in FIG. 6. What was found was a temporal stamp on which devices were more actively used during the time frame, as well as growth and decline patterns for each device. Most notable is the dramatic upward growth in the number of iPhone-iOS (line 600) and Android (line 602) users over time, as well as the more subtle but observable decline of the BlackBerry (line 604). Lines 606 and 608 in FIG. 6 represent non-mobile and other mobile devices, respectively. Interestingly, these results prove consistent with general trends in sales of the iPhone (line 600), Android (line 602), and BlackBerry (line 604) mobile devices at the time indicating that Twitter® usage data effectively shadows larger economic trends.

(3.2.1.2) Regional Device Distribution

Figure 8:
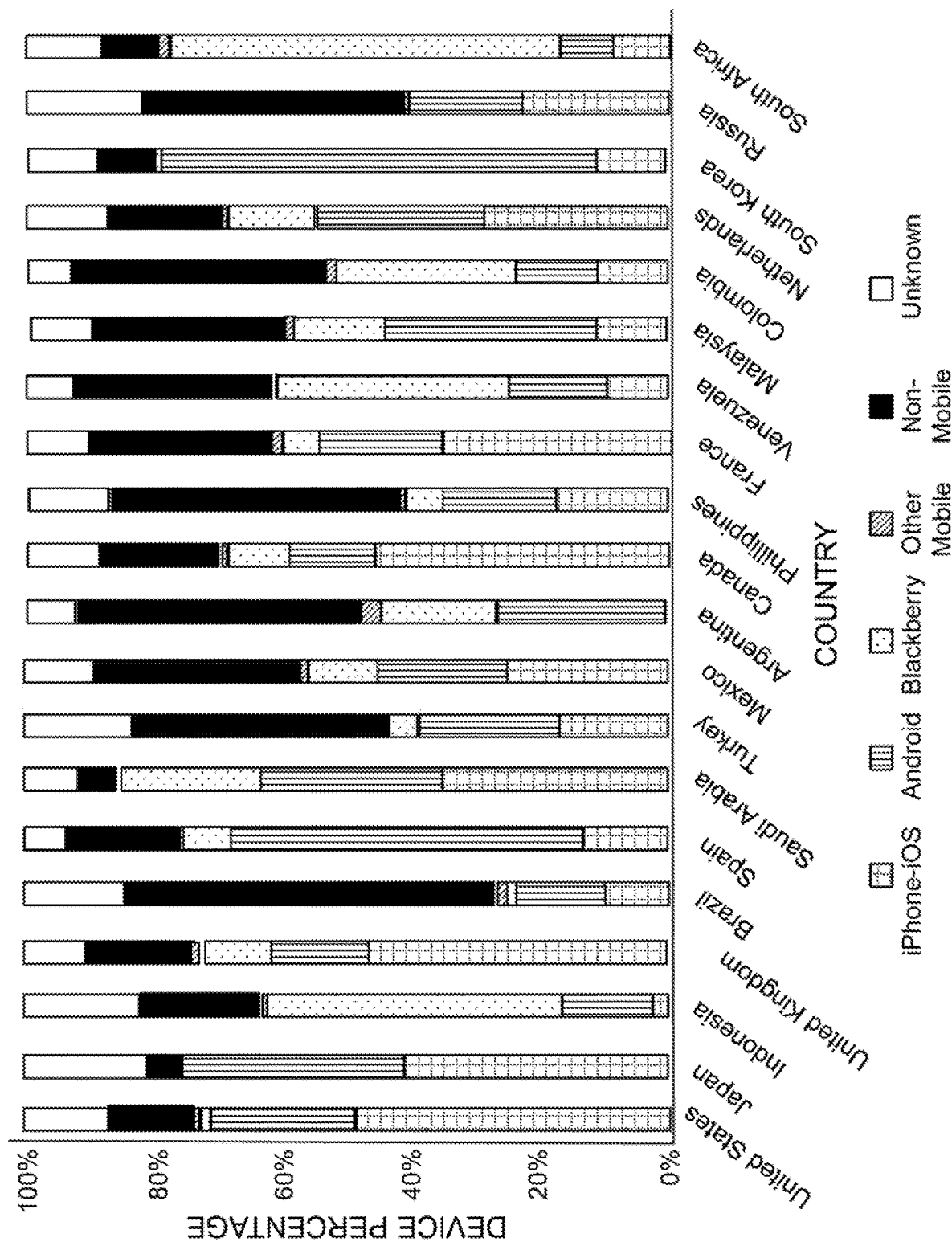
FIG. 8 illustrates device distribution across the top 20 countries according to some embodiments of the present disclosure.

Next, the aggregated regional device distribution was investigated. For analysis, the top 20 and top 12 countries with the most geotagged users were considered, which should correspond to the countries with the most, or at least most active, users. The results are shown in FIGS. 6 and 7. FIG. 6 depicts a plot of device distribution across the top 20 countries, and FIG. 7 is a table listing the top 12 countries by device type. From the results, it is observed that notable variations in device distributions exists across different countries. For example, the United States, Japan, and the United Kingdom stand out as possessing an iPhone-iOS majority, whereas Android stands out as the majority phone in Spain and South Korea, and BlackBerry in Indonesia and South Africa. From this, it is also found that in most countries, mobile devices taken together dominate over the non-mobile alternatives. However, in countries such as in Brazil, Turkey, and the Philippines, for example, non-mobile devices retain popularity. FIG. 8 illustrates device distribution across the top 20 countries according to some embodiments of the present disclosure.

(3.2.1.3) Regional Device Usage Over Time

Finally, the regional approach is combined with the temporal approach to obtain records of device usage over time, partitioned across countries. Record of device usage over time can be used to examine device growth patterns on a country level. For instance, it was observed that the trends vary notably from country to country.

Additionally, this partitioning allows one to see which countries are contributing to the worldwide trends. For example, it was determined that globally iPhone-iOS and Android were on the rise, while BlackBerry underwent decline. On a regional level, it was see that in the United States, Japan, and the United Kingdom (three of the top 4 countries), iPhone-iOS devices have been connected with ever more users, paralleling the worldwide trend. However, within two of these countries, the United States and United Kingdom, it was determined that Android usage remained relatively static, contrasting with the worldwide trend. Instead, the Android growth observed globally is instead attributable to countries such as Indonesia, Japan, and Spain, among several others.

Additionally, further insight was obtained regarding regional device distribution. For instance, it was previously observed that Indonesia had the most BlackBerry users, by both magnitude and percentage. However, from this longitudinal study, one can see precisely how its usage has changed over time. The BlackBerry device is marked by growth in the first year of study, but decline in the second half. Overall, through performing regional and longitudinal device usage analysis according to embodiments of the present disclosure, one can successfully gain deeper insight into device dispersion and usage across the globe.

(3.2.2) Device Behavioral and Feature Characterization (3.2.2.1) Regional Daytime Usage Patterns First, the time of day during which the different devices are active was investigated. To uncover daytime usage patterns, the local times during which Tweets@ were posted needed to be determined. To do so, devices identified as belonging to users within the United States, Japan, and the United Kingdom were considered, since 1) these are among the countries with the most geotagged Twitter® users, and 2) this allowed for straightforward conversion from the Twitter® data's UTC time to the desired local time. Using six evenly spaced months in the two-year period (June 2012, October 2012, February 2013, June 2013, October 2013, and February 2014), it was determined that the local time of every tweet by these users to the nearest hour, bucketed from time 0 to time 23.

Interestingly, no difference was found in daytime usage patterns across device types. Overall, all device types tend to follow the same averaged trend. Similarly, among the different countries examined, the overall daytime trend remained similar, although in Japan, tweeting peaks a bit later (11:00 PM) than in the United States and United Kingdom (10:00 PM). Japan also features local 8:00 AM and 1:00 PM peaks absent in the other two countries examined. The hours of usage, however, are reasonable: users are inactive in the very early morning, but activity increases as the day progresses, peaks in the late evening, and then drops again as the early morning once again approaches. However, it was observed that in the United States and Japan, BlackBerry features the lowest tweet percentage relative to other devices in the late evening hours, and has one of the higher Tweet® percentages relative to other devices in morning hours. Overall, it was found that in the context of Twitter®, hourly usage does not vary according to device; rather, it adheres to a fairly consistent device-wide diurnal pattern.

(3.2.2.2) Device Sentiment Over Time

Figure 9:
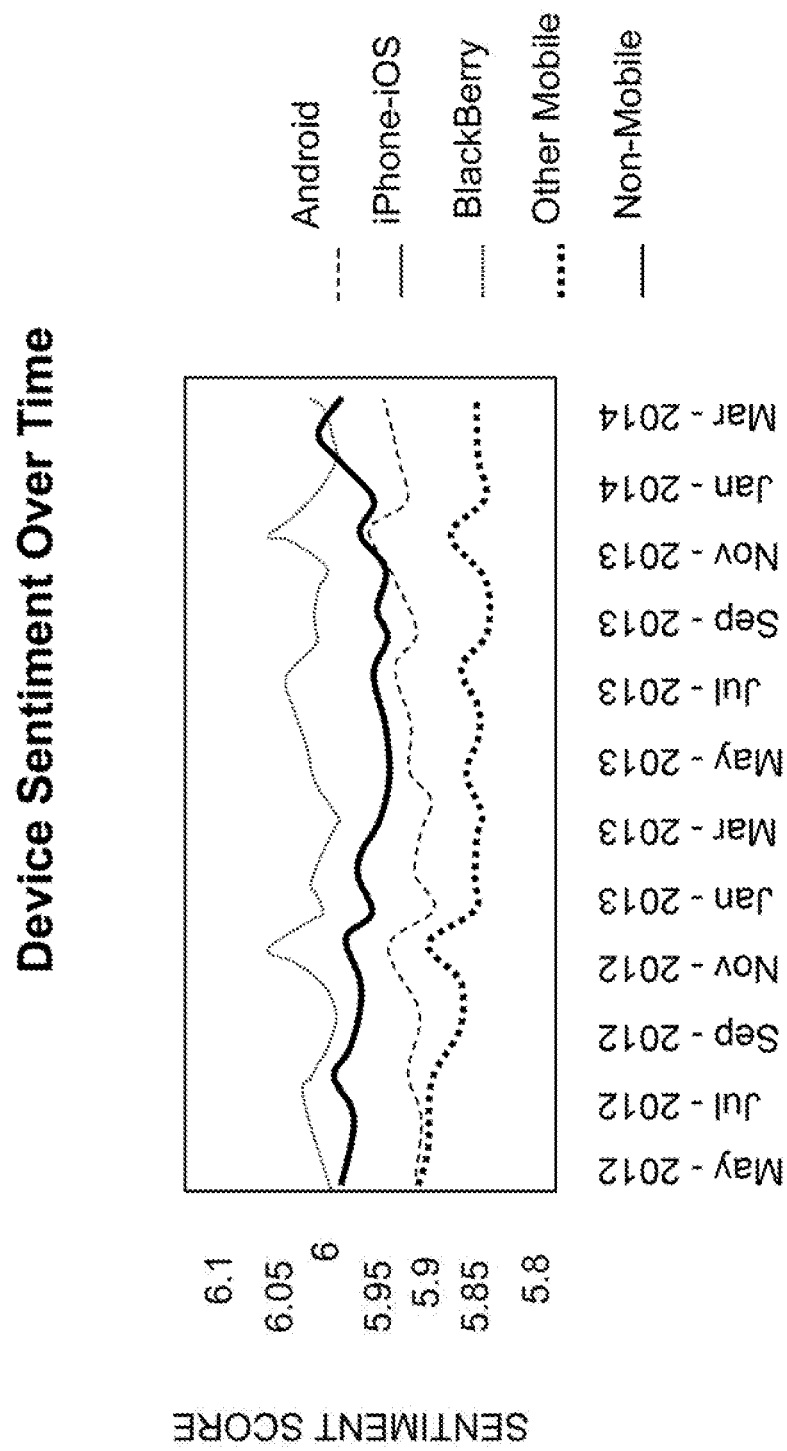
FIG. 9 is a plot illustrating device sentiment over time according to some embodiments of the present disclosure.

A longitudinal sentiment analysis was performed by computing h_avg on monthly intervals, as described above. FIG. 9 is a plot illustrating device sentiment over time. Interestingly, across the two years it was found that consistent differences in the sentiment of Tweet® content persisted across different devices. For the majority of the year, BlackBerry wins as the device tweeting content with higher sentiment, while other mobile (e.g., Windows phone, Nokia, LG phone, and Samsung mobile) consistently falls below all other devices. The observable and consistent difference in sentiment across devices is surprising, and suggests that perhaps some common quality exists among certain device users which impacts the ambient happiness of the content they choose to Tweet®.

By contrast, a similarity that persists across devices was noted; namely, seasonal sentiment peaks. In particular, sentiment across devices tends to peak in December and drop in January. This is consistent with the finding in Dodds et al. (see Literature Reference No. 9) that user sentiment increases at the end of the year and drops in the beginning of the new year, indicating that large phenomenon, such as widely observed end-of-the-year holidays, have a predictable impact regardless of device.

(3.2.2.3) Device Feature Usage Over Time

Next, device feature usage overtime was investigated, as described above. The usage of @mentions, URLs, hashtags, retweets, and the Tweets®/device average over time were investigated. FIG. 10A is a plot illustrating device feature usage over time for mentions; FIG. 10B is a plot illustrating device feature usage over time for URLs; and FIG. 10C is a plot illustrating device feature usage over time for hashtags. Overall, it was found that some features, such as mentions, vary according to device (mentions); others vary between mobile and nonmobile (URLs), and some do not vary across device (hashtags).

(3.2.3) Device Homophily Quantification

Figures 11A, 11B:
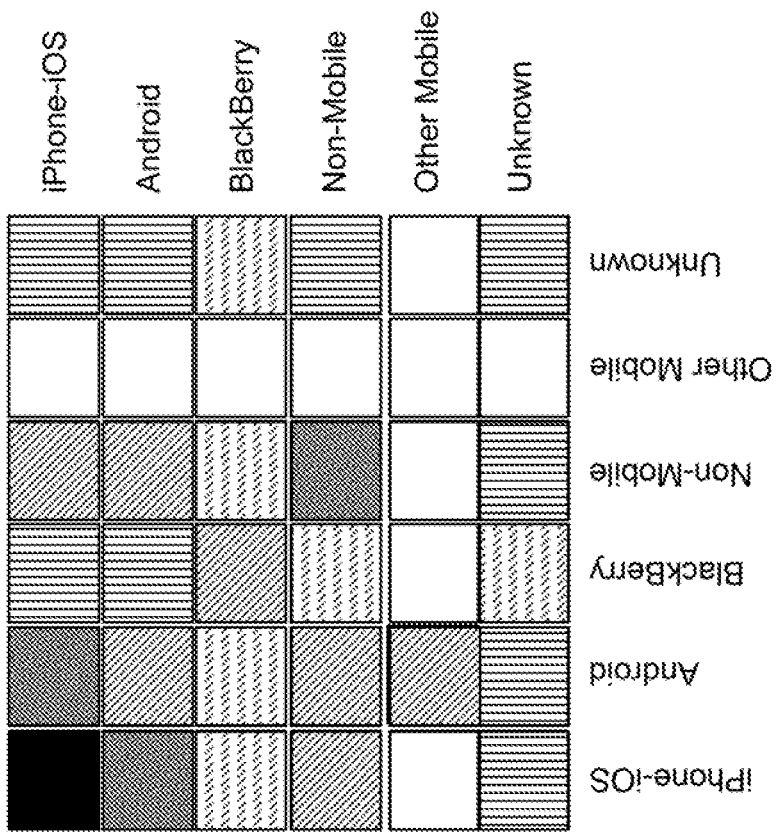
FIG. 11A is a table illustrating device and generator homophily results according to some embodiments of the present disclosure.
FIG. 11B is an illustration of a device mixing matrix heatmap according to some embodiments of the present disclosure.

Finally, device homophily applied to the Twitter® dataset was investigated, using the system subprocess delineated above. FIG. 11A is a table illustrating device and generator homophily results, and FIG. 11B is an illustration of a device mixing matrix heatmap. Overall, a network device homophily score of $h=0.094$ was obtained. This overall score suggests that the distribution of devices across the Twitter® network is close to a randomly mixed network; it seems that when it comes to Tweeting, it is not significantly more likely for users of a certain device to be connected to other users of the same device compared to a different device. However, it is interesting to note that among iPhone-iOS, BlackBerry, and non-mobile devices, there are more homophilous edges than heterophilous edges, suggesting that among certain device types, "device homophily" is stronger than others.

The above procedure was also applied on the generator level (recall that the generator is the app or website responsible for producing Tweets®, such as "Twitter for iPhone" and "Ubersocial for BlackBerry"). To do so, the 100 most common generators in the Twitter® dataset (accounts for 96.386% of users) were considered, with remaining generators grouped into "other". From this, $h=0.089$ was obtained, a result comparable to the device homophily value.

Overall, it was found that the Twitter® network exhibits low levels of device homophily on both the device and "app" level. However, it was observed that some devices exhibit higher levels of connectivity with similar devices than others. Additionally, it was found that this increases slightly as the edge threshold minimum is increased. However, applying this method to alternative device networks to further investigate this concept is a potential area for further research.

The invention described herein enables users to effectively characterize devices within a social media network across several tiers. This allows for a comprehensive understanding of differences and similarities across device categories which can be used to better understand properties of the users associated with different device types, such as favorite mobile devices, apps a user used to post on Twitter, activity patterns on social media, and user sentiments towards an event or consumer product. In particular, the system provides structured output that can be leveraged for a wide range of applications, non-limiting examples of which include targeted marketing and forecasting of device sales. For instance, mobile device sales can be correlated to the number of Tweets® published using the corresponding devices. To an extent, these two factors should be proportional. Thus, by looking at the trends of the timeseries of Tweets® (published by different devices), one can fit regression models for forecasting and predictions.

Regarding targeted marketing, the system described herein can generate and causes to be displayed to users in a targeted region an advertisement on a social media page based on analysis of the variety of communication device types. Targeted marketing involves identifying a target audience, researching traits such as spending habits and demographic information, and generating a plan to engage a potential customer with a message that is specific to the user. Display of the advertisement is further based on performing regional and temporal device characterization; performing behavioral and feature device characterization; and performing device homophily analysis on the bidirectional network.

For instance, given user-location geo-data, advertisements of products and services near the user's location can be displayed to the user when the user is on a social media webpage. Exemplary products and services that the targeted advertisements are selling may include but are not limited to vehicles, mobile devices, software, electronics, food or drinks, rentals, etc. Additionally, social media marketing can be used by businesses to offer local events and coupons/discounts to users in a geographical vicinity of the business in order to expand its customer base. The information obtained when a potential customers access the coupon/discount via the social media page can then be used for sales forecasting.

Figure 12:
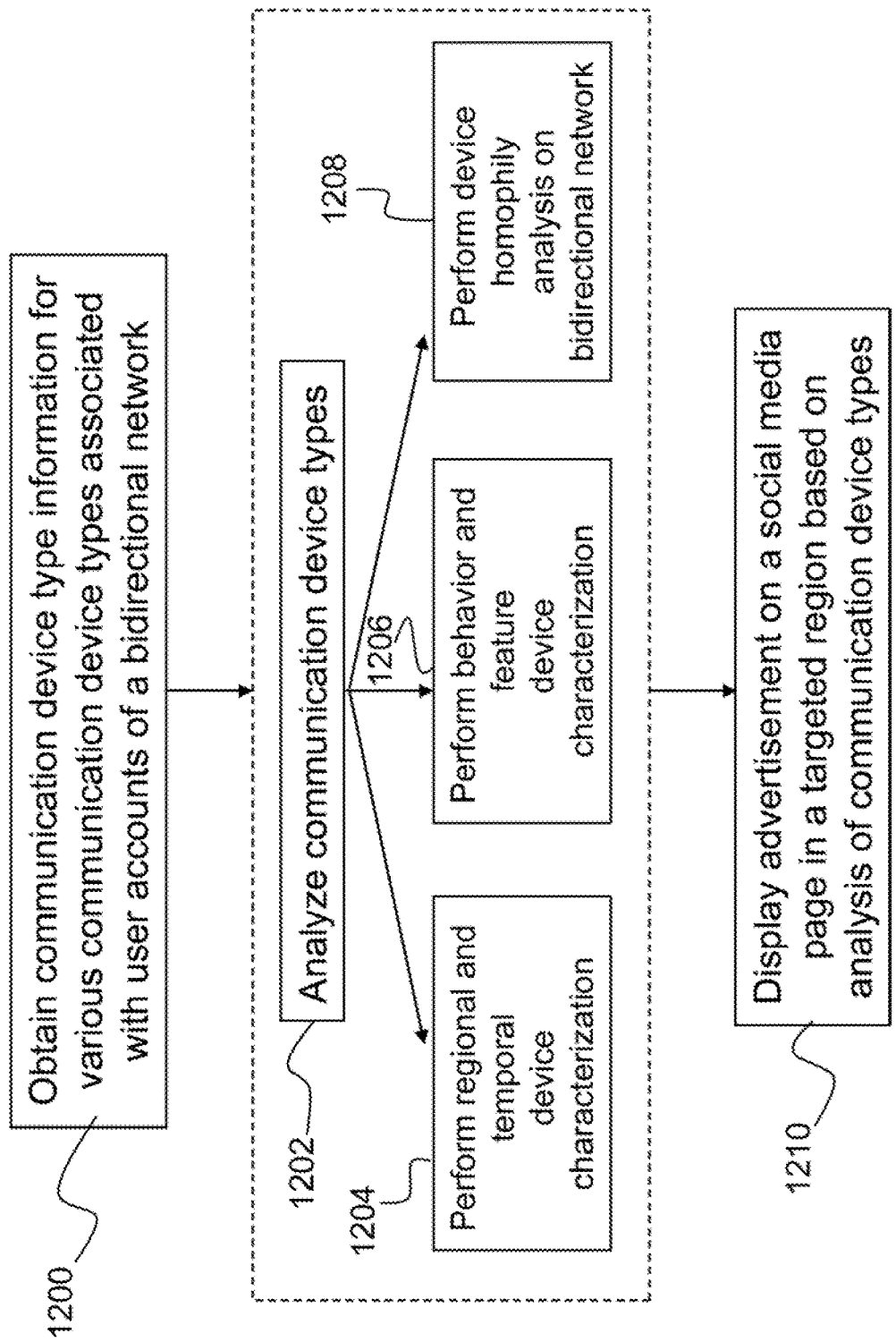
FIG. 12 is a flow diagram illustrating a device characterization system according to some embodiments of the present disclosure.

As shown in FIG. 12, the system obtains communication device information for a variety of communication device types, each device type associated with a user account of a bidirectional network (element 1200). The variety of communication device types are analyzed (element 1202), which includes performing regional and temporal device characterization (element 1204); performing behavioral and feature device characterization (element 1206); and performing device homophily analysis on the bidirectional network (element 1208). The system then causes to be displayed to a user device (e.g., mobile device (iPhone, Android, tablet), non-mobile device (laptop, desktop) in a targeted region an advertisement on a social media page based on analysis of the variety of communication device types (element 1210). The system can deliver a previously generated selected ad. Alternatively, the system can generate a custom advertisement for display.

Figure 13:
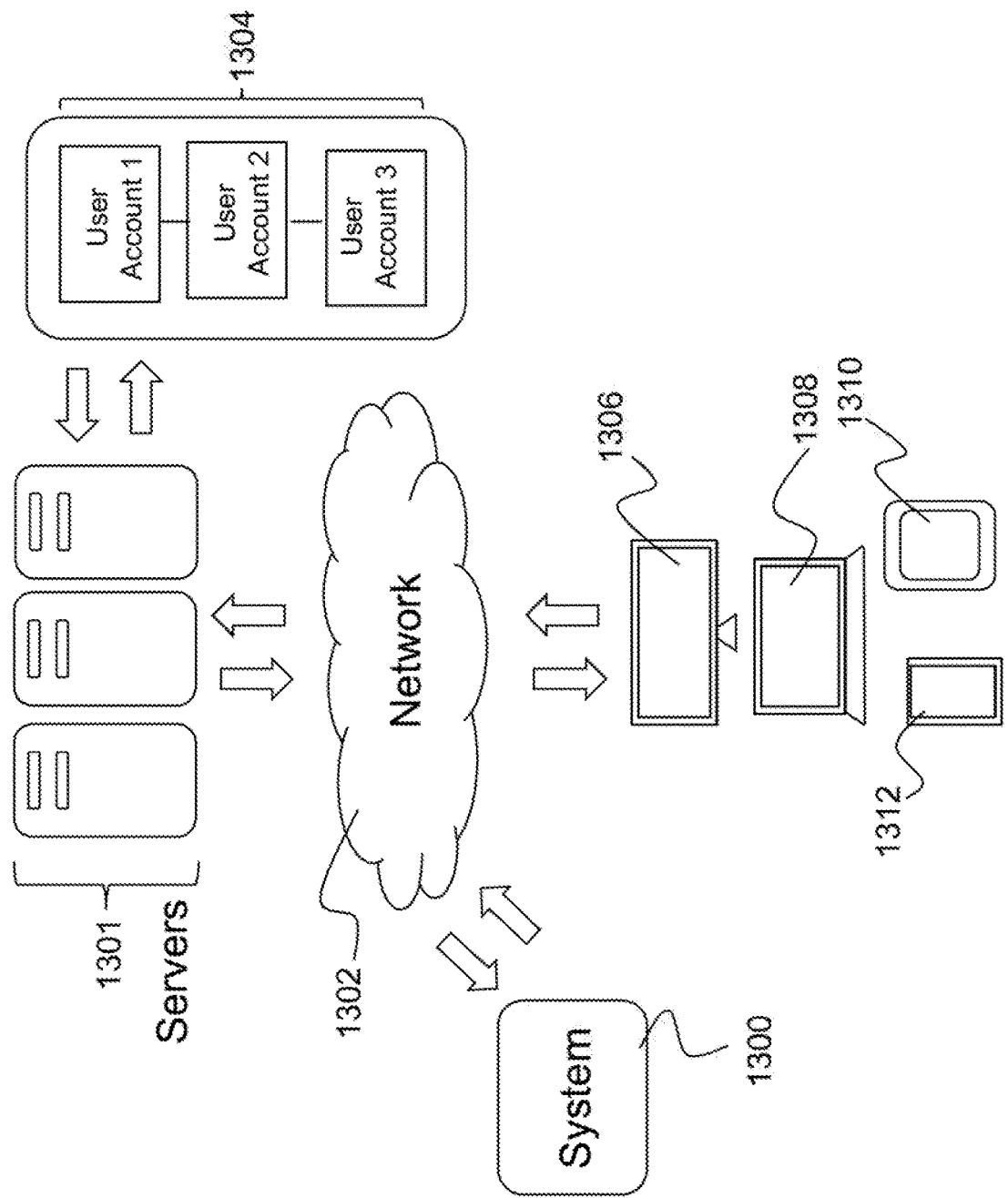
FIG. 13 is an illustration of hardware communications in the device characterization system according to some embodiments of the present disclosure.

As shown in FIG. 13, the system 1300 according to embodiments of the present disclosure connects with servers 1301 for social network platforms to access information or automatically provide targeted advertisements to a display screen on a communication device (elements, 1306, 1308, 1310, 1310) via a social network account (element 1304). The system 1300 connects via a network 1302 to servers 1301 to send and receive information relating to various social media network of interconnected user accounts (element 1304) that are accessed via mobile and non-mobile devices, non-limiting examples of which include desktops 1306, laptops 1308, iPhone 1310, and Android mobile device 1312. Non-limiting examples of user accounts (element 1304) include Facebook® user accounts and Twitter® user accounts. As can be appreciated by one skilled in the art, the user device is any device that can receive and transmit data via the network 1302. Additionally, a user account may be a user account of a social media platform, which may or may not be capable of receiving targeted marketing.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for communication device characterization, the system comprising:
a variety of types of communication devices interconnected on a bidirectional network comprising a plurality of nodes and a plurality of edges, each type of device having a display,
wherein each node in the bidirectional network corresponds to a communication device, and wherein each edge corresponds to a social connection between a pair of communication devices; and
one or more processors and a non-transitory computer-readable medium having executable instructions encoded thereon such that when executed, the one or more processors perform operations of:
obtaining communication device information from the variety of types of communication devices, each communication device associated with a user account of the bidirectional network;
analyzing the variety of types of communication devices, and based on that analysis:
performing regional and temporal device characterization;
performing behavioral and feature device characterization; and
quantifying a likelihood that users of a certain type of communication device are connected to other users of the same type of communication device within the bidirectional network,
wherein quantifying the likelihood comprises:
generating a matrix comprising weighted counts of the plurality of edges;
normalizing the matrix to create a mixing matrix;
using the mixing matrix, computing a level of assortativity in the bidirectional network by calculating an assortativity coefficient value,
wherein the assortativity coefficient value indicates a likelihood of connected users of the same type of communication device on the bidirectional network;
based on analysis of the variety of types of communication devices, obtaining location data for the variety of types of communication devices;
generating at least one of a coupon and an advertisement related to a business having a geographical location; and
transmitting the at least one of the coupon and the advertisement to the display of at least one communication device on the bi-directional network when the at least one communication device is in a geographical vicinity of the business.

2. The system as set forth in claim 1, wherein the one or more processors further perform operations of:
obtaining a set of user information related to a user of the at least one communication device when the at least one of the coupon and the advertisement is accessed by the user; and
using the set of user information for sales forecasting.

3. The system as set forth in claim 1, wherein the communication device information comprises user-device data, user-location data, and a social network of interconnected user accounts.

4. The system as set forth in claim 1, wherein the one or more processors further perform operations of:
generating patterns of global communication device usage over time;
generating a regional distribution of the variety of types of communication devices; and
generating patterns of regional communication device usage over time.

5. The system as set forth in claim 1, wherein the one or more processors further perform an operation of analyzing temporal sentiment patterns by type of communication device.

6. The system as set forth in claim 1, wherein the one or more processors further perform an operation of analyzing usage of a set of features of the bidirectional network by distinct types of communication devices over time, wherein the set of features comprises at least one of a mention of another user account on the bidirectional network, a reference to an online resource, a reference to a topic, and a re-post of another user account's post on the bidirectional network.

7. A computer program product for communication device characterization, the computer program product comprising:
a non-transitory computer-readable medium having executable instructions encoded thereon, such that upon execution of the instructions by one or more processors, the one or more processors perform operations of:
obtaining communication device information from a variety of types of communication devices, each communication device associated with a user account of a bidirectional network comprising a plurality of nodes and a plurality of edges, wherein each node in the bidirectional network corresponds to a communication device, and wherein each edge corresponds to a social connection between a pair of communication devices;
analyzing the variety of types of communication devices, and based on that analysis:
performing regional and temporal device characterization;
performing behavioral and feature device characterization; and
quantifying a likelihood that users of a certain type of communication device are connected to other users of the same type of communication device within the bidirectional network,
wherein quantifying the likelihood comprises:
generating a matrix comprising weighted counts of the plurality of edges;
normalizing the matrix to create a mixing matrix;
using the mixing matrix, computing a level of assortativity in the bidirectional network by calculating an assortativity coefficient value,
wherein the assortativity coefficient value indicates a likelihood of connected users of the same type of communication device on the bidirectional network;

based on analysis of the variety of types of communication devices, obtaining location data for the variety of types of communication devices;

generating at least one of a coupon and an advertisement related to a business having a geographical location; and transmitting the at least one of the coupon and the advertisement to a display of at least one communication device on the bi-directional network when the at least one communication device is in a geographical vicinity of the business.

8. The computer program product as set forth in claim 7, further comprising instructions for causing the one or more processors to further perform operations of:

obtaining a set of user information related to a user of the at least one communication device when the at least one of the coupon and the advertisement is accessed by the user; and using the set of user information for sales forecasting.

9. The computer program product as set forth in claim 7, wherein the communication device information comprises user-device data, user-location data, and a social network of interconnected user accounts.

10. The computer program product as set forth in claim 7, further comprising instructions for causing the one or more processors to further perform operations of:

generating patterns of global communication device usage over time;

generating a regional distribution of the variety of types of communication devices; and generating patterns of regional communication device usage over time.

11. The computer program product as set forth in claim 7, further comprising instructions for causing the one or more processors to further perform an operation of analyzing temporal sentiment patterns by type of communication device.

12. The computer program product as set forth in claim 7, further comprising instructions for causing the one or more processors to further perform an operation of analyzing usage of a set of features of the bidirectional network by distinct types of communication devices over time, wherein the set of features comprises at least one of a mention of another user account on the bidirectional network, a reference to an online resource, a reference to a topic, and a re-post of another user account's post on the bidirectional network.

13. A computer implemented method for communication device characterization, the method comprising an act of:

causing one or more processors to execute instructions encoded on a non-transitory computer-readable medium, such that upon execution, the one or more processors perform operations of:

obtaining communication device information from a variety of types of communication devices, each communication device associated with a user account of a bidirectional network comprising a plurality of nodes and a plurality of edges, wherein each node in the bidirectional network corresponds to a communication device, and wherein each edge corresponds to a social connection between a pair of communication devices;

analyzing the variety of types of communication devices, and based on that analysis:

performing regional and temporal device characterization;

performing behavioral and feature device characterization; and quantifying a likelihood that users of a certain type of communication device are connected to other users of the same type of communication device within the bidirectional network, wherein quantifying the likelihood comprises:

generating a matrix comprising weighted counts of the plurality of edges;

normalizing the matrix to create a mixing matrix;

using the mixing matrix, computing a level of assortativity in the bidirectional network by calculating an assortativity coefficient value, wherein the assortativity coefficient value indicates a likelihood of connected users of the same type of communication device on the bidirectional network;

based on analysis of the variety of types of communication devices, obtaining location data for the variety of types of communication devices;

generating at least one of a coupon and an advertisement related to a business having a geographical location; and transmitting the at least one of the coupon and the advertisement to a display of at least one communication device on the bi-directional network when the at least one communication device is in a geographical vicinity of the business.

14. The method as set forth in claim 13, wherein the one or more processors further perform operations of:

obtaining a set of user information related to a user of the at least one communication device when the at least one of the coupon and the advertisement is accessed by the user; and using the set of user information for sales forecasting.

15. The method as set forth in claim 13, wherein the communication device information comprises user-device data, user-location data, and a social network of interconnected user accounts.

16. The method as set forth in claim 13, wherein the one or more processors further perform operations of:

generating patterns of global communication device usage over time;

generating a regional distribution of the variety of types of communication devices; and generating patterns of regional communication device usage over time.

17. The method as set forth in claim 13, wherein the one or more processors further perform an operation of analyzing temporal sentiment patterns by type of communication device.

18. The method as set forth in claim 13, wherein the one or more processors further perform an operation of analyzing usage of a set of features of the bidirectional network by distinct types of communication devices over time, wherein the set of features comprises at least one of a mention of another user account on the bidirectional network, a reference to an online resource, a reference to a topic, and a re-post of another user account's post on the bidirectional network.

19. The system as set forth in claim 5, wherein the temporal sentiment patterns are analyzed via a longitudinal sentiment analyzer.

20. The method as set forth in claim 17, wherein the temporal sentiment patterns are analyzed via a longitudinal sentiment analyzer.

21. The system as set forth in claim 1, wherein a server is accessed via the bidirectional network to receive communication device information, and wherein the server is accessed to post the at least one of the coupon and the advertisement via a social media account on the bidirectional network.

\* \* \* \* \*